United States Patent [19]
Visca et al.

[11] Patent Number: 5,698,138
[45] Date of Patent: *Dec. 16, 1997

[54] MICROEMULSIONS BASED ON THREE IMMISCIBLE LIQUIDS COMPRISING A PERFLUOROPOLYETHER

[75] Inventors: Mario Visca, Alessandria; Alba Chittofrati, Milan, both of Italy

[73] Assignee: Ausimont S.P.A., Milan, Italy

[*] Notice: The term of this patent shall not extend beyond the expiration date of Pat. No. 4,990,283.

[21] Appl. No.: 483,402

[22] Filed: Jun. 7, 1995

Related U.S. Application Data

[63] Continuation of Ser. No. 921,419, Jul. 27, 1992, abandoned, which is a continuation of Ser. No. 622,137, Dec. 5, 1990, abandoned, which is a continuation of Ser. No. 158,753, Feb. 22, 1988, abandoned.

Foreign Application Priority Data

Feb. 26, 1987 [IT] Italy ............................ 19495/87

[51] Int. Cl.⁶ ............................................ B01J 13/00
[52] U.S. Cl. ............... 252/312; 252/314; 252/309; 508/582; 510/417
[58] Field of Search ...................... 252/312, 350, 252/314, 49.5; 508/582

[56] References Cited

U.S. PATENT DOCUMENTS

| | | | |
|---|---|---|---|
| 3,778,381 | 12/1973 | Rosano | 252/311 |
| 3,928,215 | 12/1975 | Dreher et al. | 252/49.5 X |
| 3,944,610 | 3/1976 | Caporiccio et al. | 252/390 X |
| 4,151,108 | 4/1979 | Sørensen et al. | 252/312 X |
| 4,523,039 | 6/1985 | Lagow et al. | 568/683 X |
| 4,706,749 | 11/1987 | Hayes et al. | 166/267 |
| 4,722,904 | 2/1988 | Feil | 252/312 X |
| 4,803,067 | 2/1989 | Brunetta et al. | 514/844 X |
| 4,990,283 | 2/1991 | Visca et al. | |

FOREIGN PATENT DOCUMENTS

| | | |
|---|---|---|
| 250766 | 1/1988 | European Pat. Off. |
| 2319971 | 11/1973 | Germany |
| 60-34730 | 2/1985 | Japan |

*Primary Examiner*—Richard D. Lovering
*Attorney, Agent, or Firm*—Bell, Boyd & Lloyd

[57] ABSTRACT

Microemulsions substantially consisting of:
- an aqueous solution,
- a perfluoropolyether having perfluoroalkyl end groups,
- a hydrocarbon compound,
- a fluorinated surfactant and optionally also of a hydrogenated or fluorinated alcohol, said microemulsions being in the form of a limpid or opalescent liquid, macroscopically consisting of a single phase, stable in a certain temperature range. The dispersing phase (or continuous phase) in the microemulsion may consist of one of the three above said liquid components, wherefore the microemulsion may be of the oil-in-water or water-in-oil type.

14 Claims, No Drawings

MICROEMULSIONS BASED ON THREE IMMISCIBLE LIQUIDS COMPRISING A PERFLUOROPOLYETHER

This is a continuation of application Ser. No. 07/921,419, filed on Jul. 27, 1992, and now abandoned; which is a Continuation of Ser. No. 07/622,137 filed on Dec. 5, 1990, and now abandoned; which is a Continuation of Ser. No. 07/158,753 filed on Feb. 22, 1988, and now abandoned.

DESCRIPTION OF THE INVENTION

The term "microemulsion" whenever used in the scientific literature, means a system macroscopically consisting of a single limpid or slightly opalescent liquid phase, comprising two immiscible liquids, and characterized by the following properties:

it is optically transparent or opalescent, it forms spontaneously by simple mixing of the components, independently of the order of mixing, it exhibits thermodynamic stability: it is indefinitely stable in a certain temperature range, it exhibits demixing reversibility: temperatures not within the range of existence cause separation into two or more than two phases, but the micro-emulsion spontaneously forms again as soon as the temperature is brought again within the range of existence.

The microscopic structure of the microemulsions reveals the presence of liquid dispersed particles having sizes in the range from 50 to 2000 Å. Also different system structures are possible, such as a mutual interdispersion of the two liquids in the form of tridimensional films, or a "co-solubilization", in which the fluids are interdispersed as regards their molecules.

Essential condition for the obtainment of a microemulsion is that the interface tension between the immiscible component liquids be reduced to a very low value owing to the presence of suitable amounts of proper surfactants.

"Oil-in-water" (o/w) microemulsions are known, in which the dispersed phase is a fluorinated compound with partially hydrogenated molecules (U.S. Pat. No. 3,778,381). The o/w and w/o ("water-in-oil") microemulsions based on perfluoropolyethers are described in Italian patent application No: 20910 A/86.

Known in the literature are multiple emulsions of the common type, consisting of more than two immiscible phases; for example in an o/w/o system, the water phase separates the two reciprocally immiscible oil phases.

Known too are emulsions of the common type consisting of three phases, comprising perfluoropolyethers, described in Italian patent application No. 20161A/85.

Conversely, microemulsions in which the dispersed phase consists of two liquids immiscible with each other and immiscible with the dispersing liquid phase are not known so far.

It has surprisingly been found that it is possible to prepare microemulsions which comprise three mutually immiscible liquids consisting of:

an aqueous solution, a perfluoropolyether having perfluoroalkyl end groups, a non-fluorinated hydrocarbon compound, and furthermore:

a fluorinated surfactant, and optionally co-surfactants belonging to the class of hydrogenated alcohols and/or fluorinated alcohols and/or non-fluorinated surfactants. Also electrolytes may be present in some cases.

The microemulsions are preparable simply by mixing the individual components in any order, or by mixing the binary microemulsions, formed by couples of the above said starting liquids.

The fluorinated surfactants contained in the microemulsions according to the present invention may be ionic or non-ionic. In particular there may be cited:

(a) the perfluorocarboxylic acids with 5 to 11 carbon atoms and the salts thereof;

(b) the perfluorosulphonic acids with 5 to 11 carbon atoms and the salts thereof;

(c) the non-ionic surfactants indicated in European Patent No. 51,526;

(d) the mono- and di-carboxylic acids derived from perfluoropolyethers and the salts thereof;

(e) the non-ionic surfactants consisting of a perfluoropolyether chain linked to a polyoxyalkylene chain;

(f) the perfluorinated cationic surfactants or those derived from perfluoropolyethers having 1, 2 or 3 hydrophobic chains.

Furthermore, the system may contain hydrogenated non-ionic, anionic or cationic surfactants and co-surfactants. The surfactants and co-surfactants which are preferred in the present invention comprise all the surfactants and co-surfactants which are utilized for preparing microemulsions of hydrocarbons. (Examples of surfactants and of co-surfactants may be found in "Macro- and Micro-emulsions" D. O. Shah., Ed., ACS Symposium series 272, ACS, Washington 1985).

As already mentioned, the microemulsions of the present invention are macroscopically composed of a single limpid or translucent phase, which is stable in a predetermined temperature range which depends on the perfluoropolyether concentration and on its molecular weight, on the type and concentration of the surfactant, and on the presence, if any, of alcohols, salts and acids.

Utilizable co-surfactants are for example:

hydrogenated alcohols with 1 to 12 carbon atoms, alcohols derived from perfluoropolyethers, alcohols comprising a perfluoropolyether chain, partially fluorinated alcohols.

Perfluoropolyethers suited to form the microemulsions of the present invention are those having an average molecular weight from 500 to 10,000 and preferably from 600 to 3000, and belonging to one or more of the following classes:

(1) 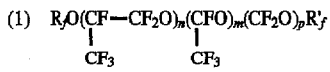

with a random distribution of the perfluorooxyalkylene units, wherein $R_f$ and $R'_f$, equal or different from each other, are $-CF_3$, $-C_2F_5$, $-C_3F_7$, and m, n, p have such average values as to fulfill the above said conditions as regards the average molecular weight.

(2) $R_fO(CF_2CF_2O)_n(CF_2O)_mR'_f$ with a random distribution of the perfluorooxyalkylene units, wherein $R_f$ and $R'_f$, either like or unlike each other, are $-CF_3$ or $-C_2F_5$, and m and n have such average values as to fulfill the above said conditions.

(3) 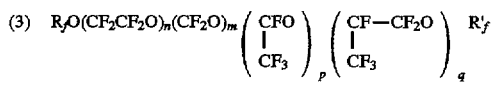

with a random distribution of the perfluorooxyalkylene units, wherein $R_f$ and $R'_f$, like or unlike each other, are —$CF_3$, —$C_2F_5$ or —$C_3F_7$, and m, n, p, q have such average values as to fulfill the above said conditions.

(4) 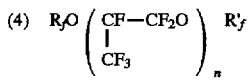

wherein $R_f$ and $R'_f$ like or unlike each other, are —$C_2F_5$ or —$C_3F_7$ and n has such value as to fulfill the above said conditions.

(5) $R_fO(CF_2CF_2O)_nR'_f$, wherein $R_f$ and $R'_f$, like or different from each other, are —$CF_3$, —$C_2F_5$, and n has such an average value as to fulfill the above-cited conditions.

(6) $R_fO(CF_2CF_2CF_2O)_nF_f$, wherein $R_f$ and $R'_f$, equal to or different from each other, are —$CF_3$ or —$C_2F_5$ or —$C_3F_7$, n having such an average value as to fulfill the above said conditions.

Perfluoropolyethers of class (1) are known in commerce under the trademark Fomblin® or Galden®, the ones of class (2) are known under the trademark Fomblin® Z, all of them produced by Montedison S.p.A.

Commercially known products of class (4) are the Krytox (Du Pont).

Those of class (5) are described in U.S. Pat. No. 4,523,039.

Those of class (6) are described in European patent EP 148,482 to Daikin.

Those of class (3) are prepared according to U.S. Pat. No. 3,665,041.

Other suitable perfluoropolyethers are those described by Lagow et al in U.S. Pat. No. 4,523,039 or in J. Am. Chem. Soc. 1985, 107, 1197–1201.

The hydrocarbon oils which may be present in the systems of the present invention are compounds which are liquid at the microemulsion stability temperature and belong to the classes of straight or branched or cyclic aliphatic hydrocarbons, or of the aryl or heterocyclic hydrocarbons or of the functional derivatives thereof such as esters and amides, having a number of carbon atoms ranging from 1 to 50, and preferably from 5 to 20.

In the preparation of microemulsions according to the present invention, systems were obtained in which the aqueous phase and the hydrocarbon phase are microdispersed in the perfluoropolyether matrix, and systems in which the perfluoropolyether and the hydrocarbon phase are microdispersed in the aqueous phase, as well as systems in which the aqueous phase and the perfluoropolyether phase are microdispersed in the hydrocarbon phase.

There is no intention of making assumptions herein about the structure of the three-phase system, and in particular about the position of the hydrocarbon phase. This could be present, for example, in the form of separated droplets, or it could be present inside the surfactant's interphase film, or it could be preferably solubilized inside a single phase (water or perfluoropolyether) or in two or more possible different positions.

At present, the conditions leading to the formation of multiple microemulsions cannot be foreseen "a priori", and are strongly dependent on the chemico-physical characteristics of the liquids and of the surfactants which are utilized.

The microemulsions of the present invention are utilizable as systems endowed with detergent and protective properties connected with the simultaneous presence of surfactants, hydrocarbon oils and perfluoropolyethers.

The microemulsions of the present invention may be used in particular in preparing lubricants containing water-soluble additives, in order to confer high stability of the dispersion of additive in the oil.

Another interesting use of the microemulsions of the present invention consists in using them as additives in fluorinated monomer polymerization processes as disclosed in European Patent Publication No. 1,180,603: in fact the perfluoropolyether microemulsions of the present invention afford the same function as the perfluoropolyether additives in the form of conventional emulsions of the above cited prior art.

The following examples are given merely to illustrate embodiments of the invention.

EXAMPLE 1

A solution was prepared containing 11 ml of an acid having a perfluoropolyether structure belonging to class (1) with $R'_f$=—$CF_2COOH$ and having an average equivalent weight of 690, 10 ml of a $NH_3$ solution at 10% by weight, 6 ml of absolute ethanol, and 20 ml of double-distilled water.

To this solution, 6 ml of a perfluoropolyether oil belonging to class (1), having an average molecular weight of 800, were added. The system consisted of a single limpid phase, stable at room temperature and capable of solubilizing 2 ml of cyclohexane. A limpid, macroscopically monophase liquid, stable between 15° C. and at least 70° C. was obtained.

If S designates the fluorinated surfactant utilized, CoS the co-surfactant (ethanol), w the water, $O_f$ the perfluoropolyether oil, $O_h$ the hydrocarbon (cyclohexane), the microemulsion composition expressed in % by weight was as follows:

S+CoS=38.4% w=43.4%

$O_f$=15.9%

$O_h$=2.3%

EXAMPLE 2

The system described in Example 1 and in the same amounts as therein indicated solubilized 1 ml of benzene, providing a limpid phase stable from 10° C. to 57° C. The wt. % of the components were as follows:

S+CoS=37.9% w=44.4%

$O_f$=16.2%

$O_h$=1.3%

EXAMPLE 3

The microemulsion of perfluoropolyether in water described in Example 1, utilized in the same amounts, was capable of solubilizing 2 ml of n-pentane; by increasing the surfactant amount, it was possible to raise the amount of solubilized hydrocarbon.

Microemulsions containing up to 4.7% by weight of n-pentane were stable at room temperature. Obtained were micro-emulsions having the following compositions:

| | | | | | |
|---|---|---|---|---|---|
| S + CoS | = | 31.3% | S + CoS | = | 57.2% |
| w | = | 43.1% | w | = | 21.0% |
| $O_f$ | = | 15.8% | $O_f$ | = | 17.1% |
| n-$C_5H_{12}$ | = | 2.7% | n-$C_5H_{12}$ | = | 4.7% |

| | |
|---|---|
| sodium dodecylsulphate (SDS) | 4.8% |
| water | 88.9% |
| $C_5H_{11}OH$ | 6.7% |
| toluene | 4.6% |

EXAMPLE 4

In the microemulsion described in Example 1, taken in the same amount, it was possible to solubilize 2 ml of n-hexane, thereby slowly obtaining a new limpid phase, stable at room temperature. The microemulsion exhibited the following composition:

S+CoS=35.1% w=46.0%

$O_f$=16.9%

$O_h$=2.0%

EXAMPLE 5

The preceding examples describe microemulsions in which the continuous phase was the aqueous phase, but also microemulsions in which the dispersant was the perfluoropolyether phase were obtained.

In particular, 10 ml of a carboxylic acid with perfluoropolyether structure, having an average molecular weight 636, salified with 5 ml of an ammonia solution at 10% by weight, in the presence of 16 ml of perfluoropolyether belonging to class (1), with an average molecular weight equal to 800, and of 4 ml of n-pentane, dissolved 3 ml of water. A room temperature-stable microemulsion having the following composition was obtained:

S=31.2% w=13.8%

$O_f$=50.7%

$O_h$=4.3%

EXAMPLE 6

A system was made up composed of 25 ml of perfluoropolyether of class (1), having an average molecular weight of 800, and 4 ml of n-hexane dissolved 2 ml of water, in the presence of 11.544 g of ammonium salt of a carboxylic acid having perfluoropolyether structure, having an average molecular weight equal to 634, of 1 ml of the same acid, and of 1 ml of t-butanol as a co-surfactant.

A limpid phase was obtained, stable to room temperature, having the following composition:

S+CoS=21.9% w=3.1%

$O_f$=70.9%

$O_h$=4.1%

The following examples illustrate the method of preparing microemulsions according to this invention, obtained by mixing binary microemulsions, for example a microemulsion of perfluoropolyether in water plus a microemulsion of a hydrocarbon in water.

EXAMPLE 7

Prepared was a limpid microemulsion of toluene in water, stable at room temperature and having the following composition in % by weight:

Prepared also was a microemulsion in wafer of perfluoropolyether, having an average molecular weight of 650, in the presence of a carboxylic acid having a perfluoropolyether structure and an average molecular weight of 367, salified with an ammonia solution at 10% by weight of $NH_3$. The solubilized system was stable at room temperature and contained:

| | |
|---|---|
| surfactant | 27.4% by weight |
| aqueous phase | 48.4% by weight |
| PFPE | 24.2% by weight |

By mixing 5.3 ml of PFPE/water microemulsion and 3 ml of toluene/water microemulsion it was possible to obtain a limpid system, indefinitely stable at a temperature lower than 24° C., in which PFPE (9.4%) and toluene (1.5%) were simultaneously solubilized in water (64.2%), in the presence of a mixture of hydrogenated and fluorinated surfactant (22.9%) and of amyl alcohol. (2.0%).

EXAMPLE 8

A fluorinated microemulsion was prepared by mixing 1 ml of PFPE having an average molecular weight equal to 660, 1 ml of an ammonia water solution at 10% by weight, 1 ml of a surfactant having a perfluoropolyether structure with a —COOH end group and an average molecular weight equal to 634, and 0.1 ml of a 0.1M $KNO_3$ solution. The system was limpid and indefinitely stable at room temperature.

By adding to the microemulsion so prepared 0.5 ml of the toluene/water microemulsion described in Example 7, an isotropic, limpid system, stable at temperatures lower than 22° C., was obtained, in which water (29.7%) and toluene (0.4%) were solubilized in PFPE (33.8%) in the presence of ionic, hydrogenated and fluorinated surfactants and of a hydrogenated co-surfactant.

EXAMPLE 9

A system containing 5 ml of PFPE having an average molecular weight equal to 650, 22.2 ml of an acid with PFPE structure and a molecular weight of 636, and 1 ml of an ammonia solution at 10% by weight, solubilized 0.7 ml of the toluene-in-water microemulsion described in Example 8.

The system obtained was limpid at room temperature and retained its characteristics also when subjected to heating up to 62°–68° C.

In this case, 10.8% of the water phase, consisting of a microemulsion of toluene in water, was solubilized in PFPE (61.4%). The amount of toluene present in the system was equal to 0.2% by weight.

EXAMPLE 10

A water-in-toluene microemulsion, stable at room temperature, having the following composition:

| | |
|---|---|
| toluene | 92.7% by weight |
| n-BuOH | 6.1% by weight |
| SDS | 0.4% by weight |
| water | 0.8% by weight | was prepared.

Prepared also was a solution containing 1.750 g of ammonium salt of the carboxylic acid having a perfluoropolyether structure and having an average molecular weight equal to 694, 5 ml of PFPE having an average molecular weight equal to 650, and 1 ml of an alcohol having structure $H(CF_2)_6CH_2OH$; this system was limpid at room temperature and solubilized 0.5 ml of the above-described w/O$_h$ microemulsion.

The resulting system was limpid up to above 60° C. and exhibited the following composition:

| | |
|---|---|
| surfactant having PFPE structure | 13.50% by weight |
| SDS | 0.02% by weight |
| fluorinated alcohol | 13.70% by weight |
| n-butanol | 0.20% by weight |
| water | 0.02% by weight |
| PFPE | 69.40% by weight |
| toluene | 3.16% by weight |

EXAMPLE 11

Prepared was a system comprising 1 ml of an acid with PFPE structure having an average molecular weight of 367, 0.5 ml of an ammonia solution at 10% by weight of $NH_3$, 0.0351 g of sodium dodecylsulphate, 1.5 ml of n-butanol, 5 ml of toluene, and 0.6 ml of fluorinated alcohol $H(CF_2)_6CH_2OH$; this system consisted of only one limpid phase, which was anisotropic at temperatures higher than 40° C. Such system was capable of solubilizing 0.1 ml of PFPE having an average molecular weight equal to 650.

The resulting solubilized system had the following composition:

| | |
|---|---|
| PFPE surfactant | 18.6% by weight |
| water phase | 5.6% by weight |
| SDS | 0.4% by weight |
| n-BuOH | 13.5% by weight |
| fluorinated alcohol | 11.9% by weight |
| toluene | 48.0% by weight |
| PFPE | 2.0% by weight | and was stable, as a limpid single phase, at temperatures higher than 44° C.

EXAMPLE 12

2.9725 g of a water-in-toluene microemulsion, stable at room temperature and containing:

| | |
|---|---|
| SDS | 0.3% by weight |
| n-BuOH | 18.3% by weight |
| toluene | 65.2% by weight |
| PFPE acid having a molecular weight of 367 | 12.5% by weight |
| ammonia sol at 10% | 3.7% by weight | were capable of solubilizing 0.2 ml of PFPE having an average molecular weight equal to 600, so providing a limpid system, stable at temperatures higher than 36° C., having the following composition:

| | |
|---|---|
| SDS | 0.27% |
| n-BuOH | 16.40% |
| toluene | 58.40% |
| PFPE acid, 367 m.w. | 11.20% |
| water | 3.31% |
| PFPE | 10.42% |

EXAMPLE 13

It is also possible to obtain solubilized systems of three immiscible phases by using non-ionic surfactants.

In particular, a W/O$_t$/O$_h$ microemulsion was prepared by adding to 2.6254 g of Triton X100 dissolved in 5 ml of toluene, 0.2 ml of a perfluoropolyether having an average molecular weight equal to 600, and 0.9 ml of an acid having a perfluoropolyether structure and an average molecular weight equal to 367, partially salified with 0.2 ml of an ammonia solution at 10% by weight of $NH_3$, in the presence of 1.6 ml of an alcohol having the structure $H(CF_2)_6CH_2OH$.

Obtained was a system consisting of a limpid single phase, stable from room temperature up to above 70° C., having the following composition:

| | |
|---|---|
| Triton X100 | 22.1% by weight |
| PFPE surfactant | 12.6% by weight |
| fluorinated alcohol | 24.0% by weight |
| aqueous phase | 1.7% by weight |
| toluene | 36.6% by weight |
| PFPE | 3.0% by weight |

It should be noticed that the same amount of PFPE is not soluble in the Triton X100/toluene system in the absence of a surfactant with perfluoropolyether structure and of a co-surfactant.

EXAMPLE 14

A microemulsion of PFPE in water was prepared by mixing 10 ml of carboxylic acid derived from PFPE having an average equivalent weight of 694, 10 ml of an ammonia solution at 10% by weight, 20 ml of water, 6 ml of ethanol, and 6 ml of PFPE having an average molecular weight of 800.

The microemulsion was stable at temperatures lower than 30°–35° C. and was alkaline (pH=about 10) due to the excess of base utilized to salify the surfactant.

5.2 ml of this microemulsion were brought to a pH=7 by addition of 0.75 ml of carboxylic acid having a perfluoropolyether structure and an average molecular weight of 634.

The OF/w microemulsion so obtained was stable at temperatures higher than 43° C. and was capable of solubilizing 0.6 ml of butyl acetate, thereby forming a system which was limpid and isotropic at temperatures higher than 45° C. At room temperature, the system was cloudy, highly viscous and strongly birefractive.

The resulting microemulsion was composed of 11.8% by weight of ester and of 88.2% of fluorinated microemulsion.

Actually, the ester constitutes a third immiscible phase as it is insoluble both in PFPE and in the water/alcohol mixture of this example.

EXAMPLE 15

0.6 ml of $CH_3COOC_4H_9$ were not miscible with 3 ml of water and 0.6 ml of ethanol in the absence of the surfactant:

however, it was possible to obtain the solubilization of the ester by addition of 1.7983 g of ammonium salt of the carboxylic acid having a perfluoropolyether structure and an average molecular weight equal to 694.

The system so obtained consisted of a phase which was limpid at temperatures higher than 58° C., while at temperatures lower than 58° C. it was birefractive and highly viscous.

This system was capable of solubilizing 0.2 ml of PFPE having an average molecular weight equal to 800, thereby forming a microemulsion, which was stable at a temperature higher than about 40° C. and which exhibited the following composition:

| PFPE surfactant | 26.8% by weight |
| --- | --- |
| water | 44.7% by weight |
| ethanol | 7.3% by weight |
| $CH_3COOC_4H_9$ | 15.7% by weight |
| PFPE | 5.5% by weight |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A microemulsion in the form of a liquid or opalescent liquid, macroscopically consisting of a single phase, indefinitely stable in a certain temperature range, consisting of a mixture of the following ingredients:

water;

a perfluoropolyether of average molecular weight from 500 to 10,000, having both end groups being perfluoroalkyl groups;

a non-fluorinated hydrocarbon compound;

a fluorinated surfactant wherein the fluorinated surfactant is:

(a) perfluorocarboxylic acids with 5 to 11 carbon atoms and their salts;

(b) perfluorosulphonic acids with 5 to 11 carbon atoms and their salts;

(c) mono- and di-carboxylic acids derived from perfluoropolyethers and their salts;

(d) non-ionic surfactants consisting of a perfluoropolyether chain linked to a polyoxyalkylene chain; or (e) perfluorinated cationic surfactants or those derived from perfluoropolyethers having 1, 2, or 3 hydrophobic chains; and optionally a co-surfactant and/or electrolytes which are non-fluorinated surfactants of the non-ionic type.

2. The microemulsion according to claim 1, wherein the perfluoropolyether is selected from the the group consisting of:

(a) 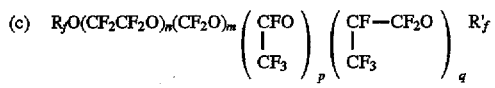

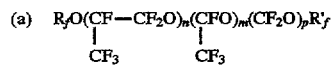

with a random distribution of the perfluorooxyalkylene units, wherein $R_f$ and $R'_f$, equal to or different from each other, are —$CF_3$, —$C_2F_5$, —$C_3F_7$, and m, n, p have such average values as to fulfill the above said conditions concerning the average molecular weight;

(b) $R_fO(CF_2CF_2O)_n(CF_2O)_mR'_f$ with a random distribution of the perfluorooxyalkylene units, wherein $R_f$ and $R'_f$, like or different from each other, are —$CF_3$ or —$C_2F_5$, and m and n have such average values as to fulfill the above said conditions;

(c) 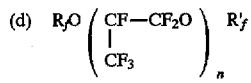

with a random distribution of the perfluorooxyalkylene units, where $R_f$ and $R'_f$, like or different from each other, are —$CF_3$, —$C_2F_5$ or —$C_3F_7$, and m, n, p, q have such average values as to fulfill the above said conditions;

(d) $R_fO\left(\begin{array}{c} CF-CF_2O \\ | \\ CF_3 \end{array}\right)_n R'_f$ where $R_f$ or $R'_f$, like or different from each other, are —$C_2F_5$ or —$C_3F_7$, and n has such a value as to fulfill the above said conditions;

(e) $R_fO(CF_2CF_2O)_nR'_f$, where $R_f$ and $R'_f$, like or different from each other, are —$CF_3$, —$C_2F_5$, and n has such an average value as to fulfill the above said conditions; and (f) $R_fO(CF_2CF_2O)_nR'_f$, where $R_f$ and $R'_f$, like or different from each other, are —$CF_3$ or —$C_2F_5$ or —$C_3F_7$, n having such an average value as to fulfill the above said conditions.

3. The microemulsion according to claim 1, wherein the hydrocarbon compound which is liquid at the microemulsion stability temperature and is selected from the group consisting of: straight, branched or cyclic alkyl hydrocarbons or aryl or heterocyclic compounds and functional derivatives thereof having a number of carbon atoms ranging from 1 to 50.

4. The microemulsion according to claim 1, wherein the microemulsion contains the co-surfactant which is selected from the group consisting of:

alcohols having a perfluoropolyether chain, hydrogenated alcohols with 1 to 12 carbon atoms, and fluorinated alcohols.

5. A process for preparing the microemulsion according to claim 1, consisting in mixing the components, taken in any order.

6. A microemulsion in the form of a liquid or opalescent liquid, macroscopically consisting of a single phase, indefinitely stable in a certain temperature range, consisting of a mixture of the following ingredients:

water;

a perfluoropolyether of average molecular weight from 500 to 10,000, having both end groups being perfluoroalkyl groups;

a non-fluorinated hydrocarbon compound;

a fluorinated surfactant wherein the fluorinated surfactant is:

(a) perfluorocarboxylic acids with 5 to 11 carbon atoms and their salts;

(b) perfluorosulphonic acids with 5 to 11 carbon atoms and their salts;

(c) mono- and di-carboxylic acids derived from perfluoropolyethers and their salts;

(d) non-ionic surfactants consisting of a perfluoropolyether chain linked to a polyoxyalkylene chain; or (e) perfluorinated cationic surfactants or those derived from perfluoropolyethers having 1, 2, or 3 hydrophobic chains; and optionally a co-surfactant and/or electrolytes which are non-fluorinated surfactants of the non-ionic type; said microemulsions formed by adding an oil component being perfluoropolyether or non-fluorinated hydrocarbon into the other oil component in amounts at least equal to the amount solubilized by the mixture.

7. The microemulsion according to claim 6, wherein the perfluoropolyether is selected from the group consisting of:

(a) 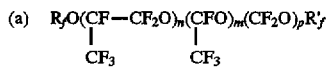

with a random distribution of the perfluorooxyalkylene units, wherein $R_f$ and $R'_f$, equal to or different from each other, are $-CF_3$, $-C_2F_5$, $-C_3F_7$, and m, n, p have such average values as to fulfill the above said conditions concerning the average molecular weight;

(b) $R_fO(CF_2CF_2O)_n(CF_2O)_mR'_f$ with a random distribution of the perfluorooxyalkylene units, wherein $R_f$ and $R'_f$, like or different from each other, are $-CF_3$ or $-C_2F_5$, and m and n have such average values as to fulfill the above said conditions;

(c) 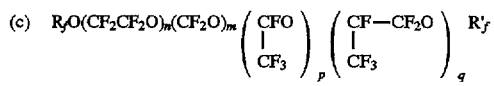

with a random distribution of the perfluorooxyalkylene units, where $R_f$ and $R'_f$, like or different from each other, are $-CF_3$, $-C_2F_5$ or $-C_3F_7$, and m, n, p, q have such average values as to fulfill the above said conditions;

(d) 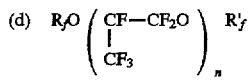

where $R_f$ or $R'_f$, like or different from each other, are $-C_2F_3$ or $-C_3F_7$, and n has such a value as to fulfill the above said conditions;

(e) $R_fO(CF_2CF_2O)_nR'_f$, where $R_f$ and $R'_f$, like or different from each other, are $-CF_3$, $-C_2F_5$, and n has such an average value as to fulfill the above said conditions; and (f) $R_fO(CF_2CF_2O)_nR'_f$, where $R_f$ and $R'_f$, like or different from each other, are $-CF_3$, $-C_2F_5$ or $-C_3F_7$, n having such an average value as to fulfill the above said conditions.

8. The microemulsion according to claim 6, wherein the hydrocarbon compound is liquid at the microemulsion stability temperature and is selected from the group consisting of: straight, branched or cyclic alkyl hydrocarbons or aryl or heterocyclic compounds and functional derivatives thereof, having a number of carbon atoms ranging from 1 to 50.

9. The microemulsion according to claim 6, wherein the microemulsion contains co-surfactant which is selected from the group consisting of:

alcohols having a perfluoropolyether chain, hydrogenated alcohols with 1 to 12 carbon atoms, and fluorinated alcohols.

10. The process for preparing the microemulsion according to claim 6, consisting in mixing the components, taken in any order.

11. The microemulsion according to claim 6, wherein the fluorinated surfactant is selected from the group consisting of the following classes:

(c) mono- and di-carboxylic acids derived from perfluoropolyethers and their salts; and (e) perfluorinated cationic surfactants or those derived from perfluoropolyethers having 1, 2, or 3 hydrophobic chains.

12. A microemulsion in the form of a liquid or opalescent liquid, macroscopically consisting of a single phase, indefinitely stable in a certain temperature range, consisting of a mixture of the following ingredients:

water;

a perfluoropolyether of average molecular weight from 500 to 10,000, having both end groups being perfluoroalkyl groups;

a non-fluorinated hydrocarbon compound;

a fluorinated surfactant wherein the fluorinated surfactant is (a) perfluorocarboxylic acids with 5 to 11 carbon atoms and their salts;

(b) perfluorosulphonic acids with 5 to 11 carbon atoms and their salts;

(c) mono- and di-carboxylic acids derived from perfluoropolyethers and their salts;

(d) non-ionic surfactants consisting of a perfluoropolyether chain linked to a polyoxyalkylene chain; or (e) perfluorinated cationic surfactants or those derived from perfluoropolyethers having 1, 2, or 3-hydrophobic chains, and optionally a co-surfactant and/or electrolytes;

wherein the microemulsion is spontaneously formed by simple mixing of the components.

13. The microemulsion according to claim 12, wherein the microemulsion is formed by adding an oil component selected from the group consisting of perfluoropolyether and non-fluorinated hydrocarbon into the other oil component in amounts at least equal to the amount solubilized by the mixture.

14. The microemulsion according to claim 12, wherein the fluorinated surfactant is selected from the group consisting of the following classes:

(c) mono- and di-carboxylic acids derived from perfluoropolyethers and their salts; and (e) perfluorinated cationic surfactants or those derived from perfluoropolyethers having 1, 2, or 3 hydrophobic chains.

* * * * *